United States Patent [19]

Laitkep et al.

[11] 4,177,998
[45] Dec. 11, 1979

[54] PACKING GLAND ASSEMBLY

[75] Inventors: Anthony A. Laitkep, Wharton; Danny S. Meyer, Richmond; Willard J. Sitton, Houston, all of Tex.

[73] Assignee: ACF Industries, Incorporated, New York, N.Y.

[21] Appl. No.: 937,683

[22] Filed: Aug. 25, 1978

[51] Int. Cl.² ............................................. F16J 15/40
[52] U.S. Cl. ....................... 277/59; 277/72 FM; 277/124
[58] Field of Search ............... 277/3, 27, 59, 71, 17, 277/72 R, 72 FM, 74, 79, 124

[56] References Cited

U.S. PATENT DOCUMENTS

| | | | |
|---|---|---|---|
| 574,353 | 12/1896 | Jarlock | 277/59 |
| 3,199,876 | 8/1965 | Magos et al. | 277/72 FM X |
| 3,434,728 | 3/1969 | Soldato | 277/59 |
| 3,776,558 | 12/1973 | Maurer et al. | 277/71 X |
| 3,785,659 | 1/1974 | Maurer et al. | 277/59 X |
| 3,823,911 | 7/1974 | Natho et al. | 251/167 |
| 3,834,715 | 9/1974 | Butler | 277/59 X |
| 3,907,307 | 9/1975 | Maurer et al. | 277/124 X |
| 4,098,561 | 7/1978 | Tschirky et al. | 277/59 X |

FOREIGN PATENT DOCUMENTS

| | | | |
|---|---|---|---|
| 993505 | 7/1951 | France | 277/59 |
| 813419 | 5/1959 | United Kingdom | 277/72 |
| 1058192 | 2/1967 | United Kingdom | 277/59 |

*Primary Examiner*—Robert S. Ward, Jr.
*Attorney, Agent, or Firm*—Eugene N. Riddle

[57] ABSTRACT

A packing assembly for a valve shaft or stem (8) consisting of inner and outer telescoping expander sleeves or rings (44, 46) slidably received intermediately in a stuffing box (32) between two groups of elastomeric sealing rings (F, G). Semi-fluid plastic sealing material is injected (60) between the expander rings to move them apart and thereby axially compress and radially expand the seal rings into sealing engagement with the stem or shaft and box wall. Portions of the plastic material pass through radial holes in the inner expander ring to form secondary seals within and about these rings.

2 Claims, 6 Drawing Figures

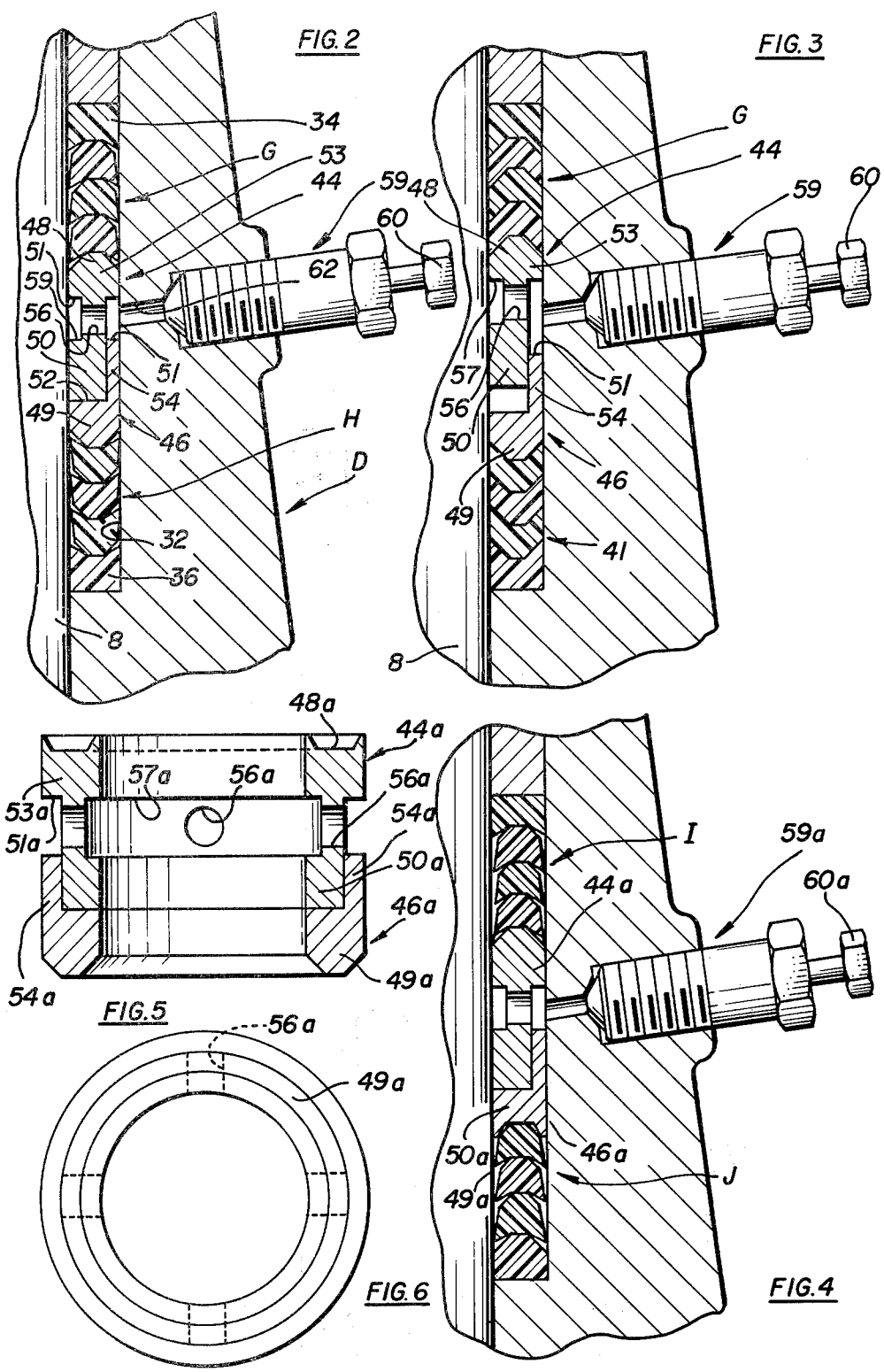

PACKING GLAND ASSEMBLY

BACKGROUND OF THE INVENTION

Packings for valve stems or shafts, for instance, V-packings for gate valve stems, have been subject to damaging cocking or rolling when tightened sufficiently to resist high pressures encountered in modern fluid systems. Moreover, previously known packings have not been readily adaptable to situations wherein the packing may be exposed to high pressures applied from either end or both ends of the packings.

SUMMARY OF THE PRESENT INVENTION

Accordingly, an object of the present invention is to provide a valve shaft or stem packing having improved means for tightening the sealing elements to better resist leakage, while resisting distortion of the seals.

Another object is to provide improved valve shaft or stem packing in which expansion means for the main sealing elements also functions as secondary sealing means.

Still another object is to provide valve shaft or stem sealing means having improved versatility as to adaption for resistance of leakage of pressured fluid from either or both directions.

In accordance with the invention there are provided, within the packing box about the shaft or stem, axially spaced groups of molded or machined, abutting, chevron or V-type seal rings. Interposed between the groups are a pair of rigid telescoping expander rings or sleeves, the outer being internally collared at its outer end to limit telescoping of the inner member so as to provide, in the collapsed positions of the rings, an external annular recess between the sleeves. The inner sleeve has radial (lanternlike) holes opening into said recess, and an internal, annular recess intersecting the holes. Plastic material is injected through a fitting in the wall of the packing box to urge the mentioned rings or sleeves axially apart and, thereby, expand the V-type seal rings into sealing engagement with the stem or shaft and box wall. Portions of the expansion material slip through the holes in the inner sleeve and also across the outer end walls of the sleeves as secondary seals within and about the expander rings.

BRIEF DESCRIPTION OF THE DRAWINGS

In the accompanying drawings which illustrate the invention,

FIG. 2 is an enlarged view of a detail of FIG. 1;

FIG. 3 is a view similar to FIG. 2, with the expander sleeves or rings expanded and with the seal rings in combination "open and closed" box arrangement;

FIG. 4 is a section similar to FIG. 2, but showing the seal rings in "open box" arrangement;

FIG. 5 is a further enlarged section showing the expander sleeves of FIG. 4 in contracted position; and FIG. 6 is a bottom plan of the form in FIG. 4.

DETAILED DESCRIPTION OF THE FIGURES

Figure 1:
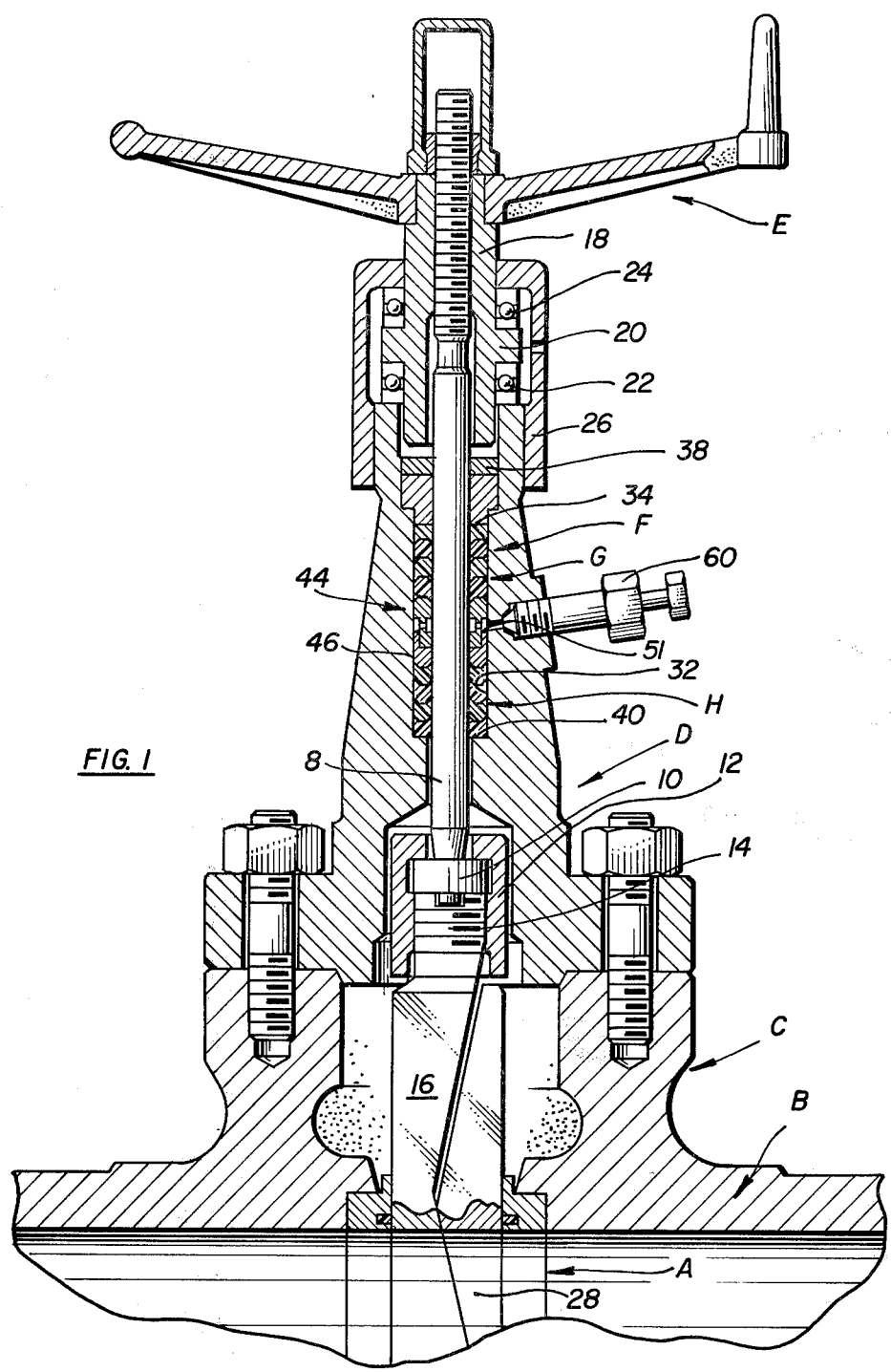
FIG. 1 is a longitudinal section illustrating the invention applied to the sutffing box of a gate valve stem.

FIG. 1 shows the invention applied to an expanding gate valve "A", as described and claimed in Natho et al U.S. Pat. No. 3,823,911 dated July 16, 1974, controlling a fluid line "B" and including the valve body "C" upon which is bolted the bonnet "D". The actuating valve stem 8 has an enlargement 10 received in an inverted cup 12 threadedly secured to a pin 14 projecting upwardly from gate valve element 16. A valve manipulating wheel "E" is secured to the upper end of a sleeve 18 threadedly mounted on the upper end of stem 8. Sleeve 18 has an intermediate external collar 20 supported between bearings 22 and 24. The bearing assembly is maintained by an inverted cup 26 threadedly secured to the upper end of bonnet "D". As will be evident, rotation of wheel "E" relative to stem 8, raises or lowers the stem and, with it, the dovetail valve element 16 relative to a wedge valving member 28.

The novel packing, generally designated "F", is received in the valve chamber 32 in bonnet "D". As better illustrated in FIG. 2, the packing consists, mainly, of upper and lower groups "G" and "H" of internested V or chevron type, molded or machined rings of suitable elastomeric, high pressure sealing material. The rings of groups "G" and "H" are oppositely disposed, i.e., with their convex portions facing, respectively, upwardly and downwardly, in combination "closed and open" box arrangement. Backup members 34 and 36 are provided, respectively, at the top and bottom of the seal ring groups. A washer 38 on top member 34 abuts the bottom of sleeve 18 when the packing is pressured, as will be explained. Bottom backup member 36 rests against a shoulder 40 at the bottom of bonnet countersink 32.

Between the inner extremities of the seal ring groups "G" and "H" are a pair of telescoping expander sleeves or rings, generally designated 44 and 46 (FIGS. 1, 2, and 3). The upper or inner ring 44 has a convex upper surface 48 for nesting within the concave under surface of the lowermost seal ring of group "G". The lower, restricted portion or inner rim 50 of upper ring 44 is of a reduced diameter and fits slidingly within the outer rim 54 formed by the countersunk upper portion 52 defining a shoulder of lower expander ring 46 so that the two rings mutually guide each other in relative axial movements. The lower surface 49 of outer (lower) expander ring 46, likewise is convex so as to nest within the concave upper surface of the uppermost seal ring of group "H". Rim portion 54 has an end which terminates short of a collar 53 on the upper end of ring 46 to form with the collar, in the collapsed positions of the rings, an external annular recess 51 between the rings. A circumferential series of radial holes 56 in rim portion 54 connect external recess 51 with an internal annular recess 57 in ring 44, adjacent the enlarged, collar-forming upper portion 48 thereof for a purpose to be described. Openings 56 open inwardly through an internal annular recess 57.

Mounted in the bonnet wall abreast of recess 51 and openings 56 therein (FIG. 2) is a pressure fitting 59. Hand plunger 60 of fitting 59 can be depressed to inject semi-fluid, plastic material into recess 51 between the expander rings, forcing them apart, and into holes 56 and recess 57, as will be explained.

FIGS. 4, 5, and 6 differ from FIGS. 1, 2, and 3 only in that the groups "I" and "J" of seal rings are all pointed downwardly to form an "open" seal box, that is, one in which all rings point toward the source of pressured fluid. As previously, the outer end surfaces of the expander rings are shaped to nest with the adjacent seal rings, in this case concavely. FIGS. 5 and 6 show the expander rings of FIG. 4 in greater detail, these being the same as in FIGS. 1, 2, and 3 as stated, except for the shaping of the seal ring engaging surfaces. Thus, the upper surface 48a of inner upper ring 44a is concave, while the lower surface 49a of lower, outer ring 46a, in this case, likewise, is concave. Other details of these latter expander rings are given the same reference numerals with the postcript "a".

OPERATION

In order to expand and tighten the sealing rings against leaks, hand plunger 60 is pressed to force the plastic material, with which the fitting is charged, into recess 51 between the expander rings 44 and 46, forcing the rings apart, as shown in FIG. 3. This, in turn, axially compresses and radially expands the seal rings "G" and "H" of both groups, sealing the stem in the packing box. The self-guiding feature of the expander rings insures the maintainance of the seal rings in optimum transverse relationship, preventing distortion thereof.

At the same time, some of the plastic material passes through holes 56 into inner annulus 57 in ring 44, thence into any clearance between the expander rings and stem 8 and, also, between the expander rings and their abutting seal rings. The thin layers of plastic material thus formed, provide effective secondary seals in case of failure of the primary V-seals.

The particular type of valve shown is illustrative of the use of the invention only, and the invention lends itself to various types of valve stems and shafts. The exclusive use of all such modifications as come within the scope of the appended claims is contemplated.

What is claimed is:

1. A packing assembly for a valve stem or shaft extending through a packing chamber having packing stops at the ends thereof, comprising outer and inner telescoping expander ring members received about the shaft or stem and fitting slidably in an intermediate part of the chamber, a plurality of V-type seal rings on opposite sides of said expander rings, an internal annular shoulder in said outer member, abutting the adjacent end of said inner ring in the collapsed positions of said expander rings, a collar at the opposite end of said inner member overlying the adjacent end of said outer member and spaced therefrom in said collapsed positions, a plurality of radial holes in said inner member adjacent said shoulder, an annular recess in the inner wall of said inner member intersecting said radial holes, and a fitting for plastic sealing material communicating with said radial holes and said recess for injection of sealing material between said expander rings to thereby separate the same and radially expand said seal rings and also to inject said seal material through said holes and recess inside and about said expander rings as secondary seal means.

2. An improved packing assembly for a valve stem extending through a packing chamber having a packing stop at each end thereof comprising:

a pair of interfitting rigid expander rings receiving said stem and fitting in opposed relation in an intermediate portion of the chamber, said expander rings having telescoping rims and mounted for sliding axial movement relative to each other axially of the stem;

a plurality of packing rings adjacent each expander ring positioned between the outer end of the associated expander ring and the adjacent packing stop;

one of the expander rings having an outer telescoping rim in an overlapping relation to an inner telescoping rim on the other expander ring, said one expander ring defining an annular shoulder in abutting relation to the end of said inner telescoping rim in a collapsed contracted position of the expander rings;

said inner telescoping rim of said other expander ring having an inner annular recess therein adjacent said stem and a plurality of circumferentially spaced holes therethrough in communication with the inner annular recess;

said other expander ring having a collar of an enlarged diameter adjacent said inner rim, said collar being spaced axially from the end of said outer telescoping rim to define therebetween an outer annular recess in communication with said holes; and a fitting for plastic sealing material communicating with said outer annular recess for injection of sealing material between the rings to separate the expander rings axially of the stem and for injection of sealing material through said holes and said inner annular recess along the stem.

* * * * *